United States Patent
Maruyama

(10) Patent No.: US 7,130,387 B2
(45) Date of Patent: Oct. 31, 2006

(54) COMMUNICATION TERMINAL, COMMUNICATION METHOD AND PROGRAM THEREOF

(75) Inventor: Shigeru Maruyama, Tokyo (JP)

(73) Assignee: NEC Corporation, Tokyo (JP)

( * ) Notice: Subject to any disclaimer, the term of this patent is extended or adjusted under 35 U.S.C. 154(b) by 404 days.

(21) Appl. No.: 10/295,604

(22) Filed: Nov. 15, 2002

(65) Prior Publication Data

US 2003/0091164 A1 May 15, 2003

(30) Foreign Application Priority Data

Nov. 15, 2001 (JP) ............... 2001/350402

(51) Int. Cl.
*H04M 1/64* (2006.01)
(52) U.S. Cl. ................................ 379/88.01
(58) Field of Classification Search ............ 379/88.03, 379/88.01, 88.02; 455/563
See application file for complete search history.

(56) References Cited

U.S. PATENT DOCUMENTS

| | | | |
|---|---|---|---|
| 5,204,894 A * | 4/1993 | Darden | 379/88.03 |
| 5,509,049 A * | 4/1996 | Peterson | 455/563 |
| 5,651,056 A * | 7/1997 | Eting et al. | 379/88.01 |
| 5,652,789 A * | 7/1997 | Miner et al. | 379/201.01 |
| 5,881,134 A * | 3/1999 | Foster et al. | 379/88.01 |
| 6,377,820 B1 * | 4/2002 | Courtis et al. | 455/563 |
| 6,697,455 B1 * | 2/2004 | Krofchalk | 379/88.03 |
| 6,744,861 B1 * | 6/2004 | Pershan et al. | 379/88.03 |
| 2004/0057562 A1 * | 3/2004 | Myers et al. | 379/88.14 |

FOREIGN PATENT DOCUMENTS

| | | |
|---|---|---|
| EP | 0 800 304 | 10/1997 |
| EP | 1187431 A1 | 9/2000 |
| GB | 2344028 A | 9/1999 |
| JP | 61-172470 | 8/1986 |
| JP | 63024750 A | 2/1988 |
| JP | 05-153221 | 6/1993 |
| JP | 10-243079 | 9/1998 |
| JP | 11-65590 | 3/1999 |

* cited by examiner

*Primary Examiner*—Wing Chan
*Assistant Examiner*—Simon Song
(74) *Attorney, Agent, or Firm*—Scully, Scott, Murphy & Presser, P.C.

(57) ABSTRACT

A communication terminal, a communication method and a program thereof capable of easily recording a name and a telephone number of the other party to be called, and easily calling the recorded telephone number by voice. A voice recognizing section recognizes a telephone number output from the directory service and converts a destination name input from a microphone into a format recognizable by the voice recognizing section. The recognized telephone number is associated with the destination name, both of which are recorded in a telephone number recording section. When the destination name is input by voice from the microphone, the voice recognizing section recognizes the input destination name. A control section reads the telephone number associated with the recognized destination name. Subsequently, a telephone number calling section calls the read telephone number.

12 Claims, 7 Drawing Sheets

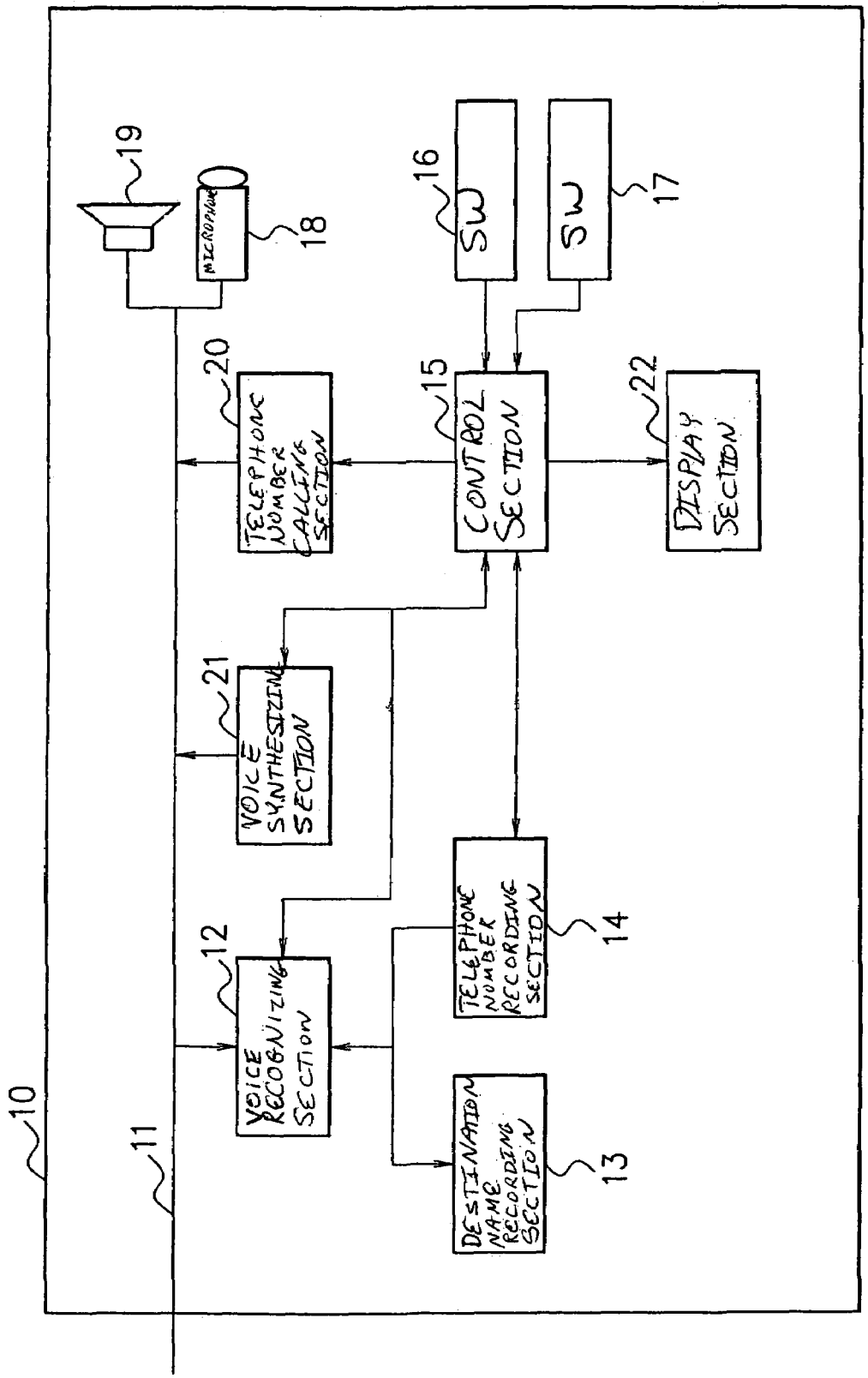

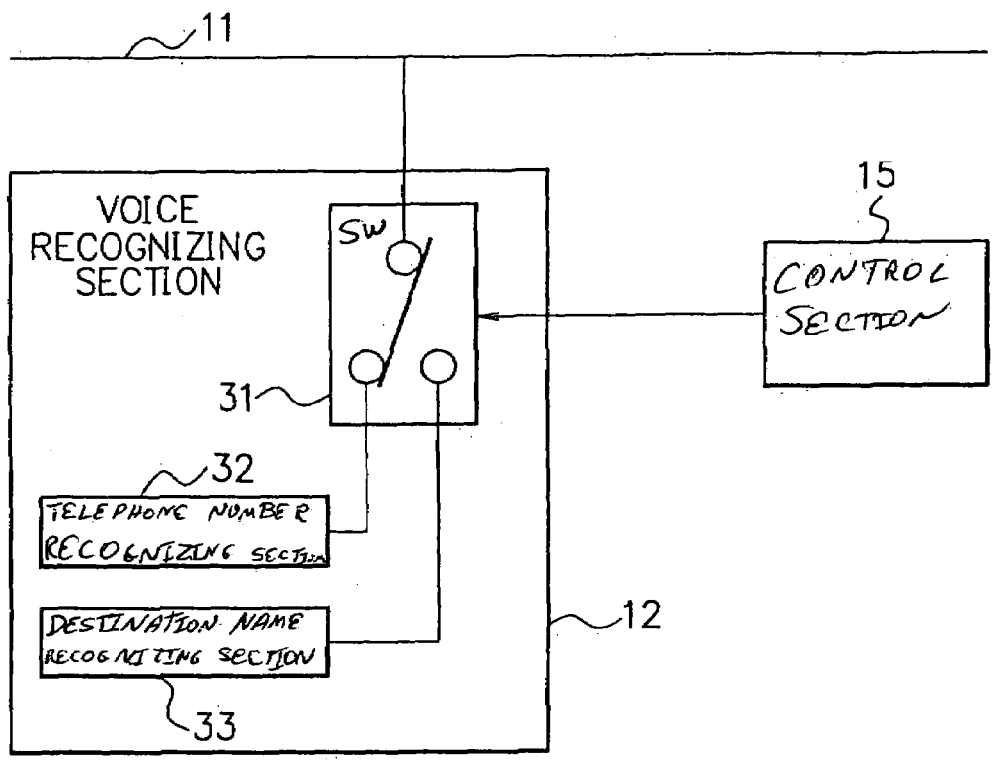

COMMUNICATION TERMINAL, COMMUNICATION METHOD AND PROGRAM THEREOF

BACKGROUND OF THE INVENTION

The present invention relates to a communication terminal, a communication method and a program thereof, and in particular, to a communication terminal, a communication method and a program thereof capable of inputting a telephone number and a destination name by voice and initiating calling operation by voice.

DESCRIPTION OF THE RELATED ART

"Directory service" is one of the telephone information services. Conventionally, when utilizing the directory service, a user had to once write down a telephone number uttered by an operator to dial the number. This operation at the phone is troublesome, and particularly while driving, such operation as writing down and dialing the telephone number may involve risk.

To solve the problem above, a cellular phone unit has been disclosed in Japanese Patent Application Laid-Open No. HEI 11-308315 (prior example 1). In the prior example 1, first, a user records voice of the other party in a memory while on the phone. After hanging up the phone, when the recorded voice is played back, a telephone number included in the recorded voice is recognized. The recognized telephone number is recorded in a telephone book.

On the other hand, a voice adapter has been disclosed in Japanese Patent Application Laid-Open No. HEI 5-316189 (prior example 2). In the prior example 2, after a user dictates the name of the other party and the name is voice-recognized by the voice adapter, the user inputs a telephone number of the other party by pushing buttons to associate the telephone number with the name. The associated name and telephone number is stored in a memory. After the recording, when the user utters the name of the other party, the dial number associated with the name of the other party is read out of the memory to make a call.

As another example, telephone equipment provided with a directory-service voice recognition device has been disclosed in Japanese Patent Application Laid-Open No. HEI 9-181813 (prior example 3). The telephone equipment recognizes a telephone number in the voice from the directory service to record it. Afterwards, a user looks up the recorded telephone number to make a call.

As further another example, a voice dialing apparatus has been disclosed in Japanese Patent Application Laid-Open No. HEI 9-162966 (prior example 4). In the prior example 4, a user registers in advance the name and a telephone number of the other party in correspondence with each other by keystroke or the like. Afterwards, when a user inputs the name of the other party by voice, the voice dialing apparatus recognizes the name input by voice to determine whether or not the recognized name has been registered therein. When the name has been registered, the apparatus dials the telephone number associated with the registered name.

However, in the prior example 1, a user has to consult the telephone book in which a plurality of telephone numbers have been recorded for the intended telephone number before dialing, and thereby, the operation becomes complicated. In addition, when recording a new telephone number, the user needs to confirm whether or not the same number has been recorded in the telephone book. Moreover, the same number may be wrongly double-recorded.

In the prior example 2, before registering the telephone number, the user has to obtain the number from the directory service or the like and transcribe it on paper, etc. in advance. In addition, when registering a new telephone number, the user needs to confirm whether or not the same number has been stored in the memory. Moreover, the same number may be wrongly double-recorded.

Even by the combination of the prior examples 1 and 2, it is impossible to solve the problems.

In the prior example 3, there exists the same problems as in the prior example 1, and in addition, there is not disclosed any configuration to associate the recognized telephone number with the name.

Both of the prior examples 3 and 4 do not disclose the configuration as proposed by the present invention, which enables input of the name and the telephone number by voice while associating them with each other, and enables a call to be made by voice.

SUMMARY OF THE INVENTION

It is therefore an object of the present invention to provide a communication terminal, a communication method and a program thereof for easily recording a name and a telephone number of a destination party to be called and easily calling the recorded telephone number by an utterance.

According to a first aspect of the present invention, for achieving the objects mentioned above, there is provided a communication terminal for recognizing a vocally input telephone number to record the telephone number, recording an input destination name in the form of voice data, and associating the recorded telephone number with the recorded destination name.

According to a second aspect of the present invention, in the first aspect, the communication terminal recognizes an input voice, and reads, when the recognized voice is identical with one of the recorded destination names, the telephone number associated with the destination name to call the telephone number.

According to a third aspect of the present invention, there is provided a communication terminal connected to another communication terminal via a communication line for inputting voice via the communication line, comprising:

a voice inputting means for inputting voice around the communication terminal;

a telephone number voice recognizing means for recognizing a telephone number input by voice;

a telephone number recording means for recording the telephone number recognized by the telephone number voice recognizing means;

a destination name recording means for recording a destination name input by voice in the form of voice data; and an association recording means for recording the destination name recorded by the destination name recording means in association with the recorded telephone number.

According to a fourth aspect of the present invention, in the third aspect, the destination name recording means monitors an input voice, converts the input voice into the voice data when detecting the input voice, and records the voice data as the destination name.

According to a fifth aspect of the present invention, in the third or fourth aspect, the communication terminal includes:

a telephone number record determining means for determining whether or not the telephone number recognized by the telephone number voice recognizing means has been recorded by the telephone number recording means; and a telephone number record rejecting means for rejecting, when the telephone number record determining means determines that the recognized telephone number has been recorded, newly recording the recognized telephone number, and informing a user that the telephone number is not to be newly recorded.

According to a sixth aspect of the present invention, in any one of the third to fifth aspects, the communication terminal includes:

a destination name voice recognizing means for recognizing an input voice to determine whether or not the recognized voice is identical with one of the destination names recorded by the destination name recording means; and a calling means for reading, when the destination name voice recognizing means determines that the input voice is identical with the recorded destination name, the telephone number associated with the destination name to call the telephone number.

According to a seventh aspect of the present invention, in the sixth aspect, the communication terminal includes a directory service calling means for calling, when the destination name voice recognizing means determines that the input voice is not identical with any of the recorded destination names, a directory service to establish connection thereto via the communication line.

According to an eighth aspect of the present invention, in any one of the third to seventh aspects, the communication terminal includes:

an input voice determining means for determining whether the input voice is input via the communication line or input through the voice inputting means; and a voice recognition control means for controlling the voice recognition based on a result of the determination by the input voice determining means.

According to a ninth aspect of the present invention, in the eighth aspect, the voice recognition control means controls the voice recognition on the basis of the determination that:

when the input voice determining means determines that the input voice is input via the communication line, the input voice indicates the telephone number; or when the input voice determining means determines that the input voice is input through the voice inputting means, the input voice indicates the destination name.

According to a tenth aspect of the preset invention, in any one of the third to ninth aspects, the communication terminal includes an informing means for informing a user of a recognition result obtained in connection with the input voice or that the input voice has not been recognized.

According to an eleventh aspect of the present invention, there is provided a communication method comprising the steps of recognizing a vocally input telephone number to record the telephone number, recording an input destination name in the form of voice data, and associating the recorded telephone number with the recorded destination name.

According to a twelfth aspect of the present invention, in the eleventh aspect, the communication method further includes the steps of recognizing an input voice, and reading, when the recognized voice is identical with one of the recorded destination names, the telephone number associated with the identified destination name to call the telephone number.

According to a thirteenth aspect of the present invention, there is provided a communication method using a communication terminal connected to another communication terminal via a communication line for inputting voice via the communication line, comprising:

a voice inputting step for inputting voice around the communication terminal;

a telephone number voice recognizing step for recognizing a telephone number input by voice;

a telephone number recording step for recording the telephone number recognized at the telephone number voice recognizing step;

a destination name recording step for recording a destination name input by voice in the form of voice data; and an association recording step for recording the destination name recorded at the destination name recording step in association with the recorded telephone number.

According to a fourteenth aspect of the present invention, in the thirteenth aspect, at the destination name recording step, an input voice is monitored and converted into the voice data when detected to record the voice data as the destination name.

According to a fifteenth aspect of the present invention, in the thirteenth or fourteenth aspect, the communication method includes:

a telephone number record determining step for determining whether or not the telephone number recognized at the telephone number voice recognizing step has been recorded at the telephone number recording step; and a telephone number record rejecting step for rejecting, when it is determined that the recognized telephone number has been recorded at the telephone number record determining step, newly recording the recognized telephone number, and informing a user that the telephone number is not to be newly recorded.

According to a sixteenth aspect of the present invention, in any one of the thirteenth to fifteenth aspects, the communication method includes:

a destination name voice recognizing step for recognizing an input voice to determine whether or not the recognized voice is identical with one of the destination names recorded at the destination name recording step; and a calling step for reading, when it is determined that the input voice is identical with the recorded destination name at the destination name voice recognizing step, the telephone number associated with the destination name to call the telephone number.

According to a seventeenth aspect of the present invention, in the sixteenth aspect, the communication method includes a directory service calling step for calling, when it is determined that the input voice is not identical with any of the recorded destination names at the destination name voice recognizing step, a directory service to establish connection thereto via the communication line.

According to an eighteenth aspect of the present invention, in any one of the thirteenth to seventeenth aspects, the communication method includes:

an input voice determining step for determining whether the input voice is input via the communication line or input through the voice inputting step; and a voice recognition control step for controlling the voice recognition based on a result of the determination at the input voice determining step.

According to a nineteenth aspect of the present invention, in the eighteenth aspect, at the voice recognition control step, the voice recognition is controlled on the basis of the determination that:

when it is determined that the input voice is input via the communication line at the input voice determining step, the input voice indicates the telephone number; or when it is determined that the input voice is input through the voice inputting step at the input voice determining step, the input voice indicates the destination name.

According to a twentieth aspect of the present invention, in any one of the thirteenth to nineteenth aspects, the communication method includes an informing step for informing a user of a recognition result obtained in connection with the input voice or that the input voice has not been recognized.

According to a twenty-first aspect of the present invention, there is provided a program for having a computer execute the processes of recognizing a vocally input telephone number to record the telephone number, recording an input destination name in the form of voice data, and associating the recorded telephone number with the recorded destination name.

According to a twenty-second aspect of the present invention, in the twenty-first aspect, the program has a computer execute the processes of recognizing an input voice, and reading, when the recognized voice is identical with one of the recorded destination names, the telephone number associated with the destination name to call the telephone number.

According to a twenty-third aspect of the present invention, there is provided a computer readable program, to control a communication terminal which is connected to another communication terminal via a communication line and into which voice is input via the communication line, for having a computer execute:

a voice inputting process for inputting voice around the communication terminal;

a telephone number voice recognizing process for recognizing a telephone number input by voice;

a telephone number recording process for recording the telephone number recognized in the telephone number voice recognizing process;

a destination name recording process for recording a destination name input by voice in the form of voice data; and an association recording process for recording the destination name recorded in the destination name recording process in association with the recorded telephone number.

According to a twenty-fourth aspect of the present invention, in the twenty-third aspect, in the destination name recording process, an input voice is monitored and converted into the voice data when detected to record the voice data as the destination name.

According to a twenty-fifth aspect of the present invention, in the twenty-third or twenty-fourth aspect, the program has the computer execute:

a telephone number record determining process for determining whether or not the telephone number recognized in the telephone number voice recognizing process has been recorded in the telephone number recording process; and a telephone number record rejecting process for rejecting, when it is determined that the recognized telephone number has been recorded in the telephone number record determining process, newly recording the recognized telephone number, and informing a user that the telephone number is not to be newly recorded.

According to a twenty-sixth aspect of the present invention, in any one of the twenty-third to twenty-fifth aspects, the program has the computer execute:

a destination name voice recognizing process for recognizing an input voice to determine whether or not the recognized voice is identical with one of the destination names recorded in the destination name recording process; and a calling process for reading, when it is determined that the input voice is identical with the recorded destination name in the destination name voice recognizing process, the telephone number associated with the destination name to call the telephone number.

According to a twenty-seventh aspect of the present invention, in the twenty-sixth aspect, the program has the computer execute a directory service calling process for calling, when it is determined that the input voice is not identical with any of the recorded destination names in the destination name voice recognizing process, a directory service to establish connection thereto via the communication line.

According to a twenty-eighth aspect of the present invention, in any one of the twenty-third to twenty-seventh aspects, the program has the computer execute:

an input voice determining process for determining whether the input voice is input via the communication line or input through the voice inputting process; and a voice recognition control process for controlling the voice recognition based on a result of the determination in the input voice determining process.

According to a twenty-ninth aspect of the present invention, in the twenty-eighth aspect, in the voice recognition control process, the voice recognition is controlled on the basis of the determination that:

when it is determined that the input voice is input via the communication line in the input voice determining process, the input voice indicates the telephone number; or when it is determined that the input voice is input through the voice inputting process in the input voice determining process, the input voice indicates the destination name.

According to a thirtieth aspect of the present invention, in any one of the twenty-third to twenty-ninth aspects, the program has the computer execute an informing process for informing a user of a recognition result obtained in connection with the input voice or that the input voice has not been recognized.

That is, according to the present invention, the communication terminal basically includes a means for recognizing numbers as telephone number information from voice input through a communication line and recognizing a destination name, a means for associating the recognized telephone number with the destination name, a means for recording the associated telephone number and destination name, a means for inputting a destination name, and a means for learning and recording a destination name to recognize the destination name when calling.

Besides, according to the present invention, voice is sent through the communication line. Subsequently, a telephone number in the sent voice is recognized. When the telephone number is recognized, a user vocally inputs a destination name to associate the input destination name with the telephone number recognized in the voice recognizing section. The voice indicating the associated destination name is recorded for voice recognition. When calling the destination party, the user vocally inputs the destination name. The input voice is recognized with reference to the recorded destination name. When it is recognized that the destination name indicated by the input voice is the same as one of the recorded destination names, the telephone number associated with the destination name is read to execute calling operation.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing a configuration of a communication terminal according to a first embodiment of the present invention;

FIG. 2 is a block diagram showing a configuration of a voice recognizing section used in the first embodiment;

FIG. 3 is a management table in a telephone number recording section used in the first embodiment;

DESCRIPTION OF THE PREFERRED EMBODIMENTS

Figure 4:
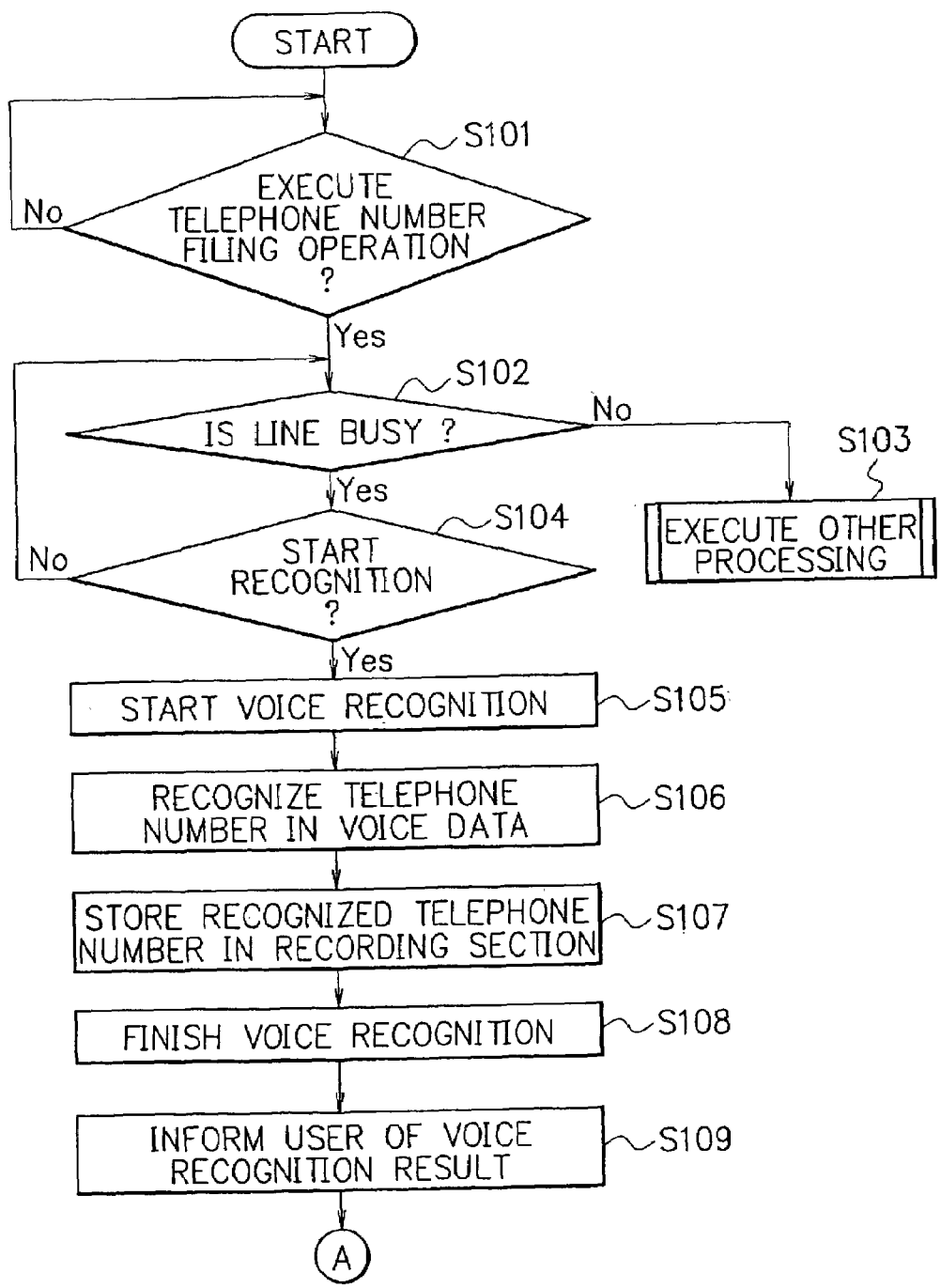
FIG. 4 is a flowchart showing a flow of operation to record a telephone number by the communication terminal according to the first embodiment.

Referring now to the drawings, embodiments of the present invention are explained in detail.

[First Embodiment]

A communication terminal 10 may be telephone equipment connected to a common public network by wire, or a portable terminal, PHS, PDA or the like connected thereto by wireless. If having the following configuration, the other devices may be adopted.

FIG. 1 is a block diagram showing a configuration of the communication terminal 10 according to the first embodiment of the present invention. In the following, an explanation is given of a configuration and operation of the communication terminal 10 according to the first embodiment.

The communication terminal 10 comprises a communication line 11, a voice recognizing section 12, a destination name recording section 13, a telephone number recording section 14, a control section 15, a learning SW (switch) 16, a start SW 17, a microphone 18, a speaker 19, a telephone number calling section 20, a voice synthesizing section 21 and a display section 22.

The control section 15 is coupled with the voice recognizing section 12, the telephone number recording section 14, the learning SW 16, the start SW 17, the telephone number calling section 20, the voice synthesizing section 21 and the display section 22. The control section 15 sends control signals to the respective sections to control the whole of the communication terminal 10. Further, the control section 15 executes write-in and read-in control for telephone numbers recorded in the telephone number recording section 14.

The communication line 11 is a communication channel of voice signals and the like, and coupled with the voice recognizing section 12, the microphone 18, the speaker 19, the telephone number calling section 20 and the voice synthesizing section 21. Incidentally, the communication line 11 may be a telephone line connected to another communication terminal (such as telephone equipment, etc.) via the public network or the like. Alternatively, through the communication line 11, the communication terminal 10 may communicate with another communication terminal by wireless via an antenna or the like.

The voice recognizing section 12 recognizes voice input from another communication terminal through the communication line 11 (such as voice from the directory service, etc.), voice indicating (pronouncing) the name of a destination party recorded in the destination name recording section 13, and voice input from the microphone 18. Additionally, the voice recognizing section 12 converts voice input through the communication line 11 into information (data format) recognizable by the section 12. Incidentally, the term "voice" includes human voice, synthetic voice and the like. The voice recognizing section 12 is coupled with the communication line 11, the destination name recording section 13, the telephone number recording section 14 and the control section 15.

In the destination name recording section 13, names of the other parties whom a user may call (hereinafter referred to as "destination names") are recorded in the data format recognizable by the voice recognizing section 12. The section 13 is coupled with the voice recognizing section 12 and the telephone number recording section 14.

In the telephone number recording section 14, telephone numbers are recorded with the corresponding destination names, respectively. The section 14 is coupled with the voice recognizing section 12, the destination name recording section 13 and the control section 15.

The telephone number calling section 20 calls a telephone number received from the control section 15. The voice synthesizing section 21 executes voice synthesis (voice-synthesizes) to generate predetermined voice message.

Through the microphone 18, voice is input, namely, voice around the communication terminal 10 is input. On the other hand, through the speaker 19, voice is output. The term "voice" includes the synthesized voice generated at the voice synthesizing section 21 and the like. The display section 22 is, for example, LCD (Liquid Crystal Display) for displaying characters, images and the like.

When a user pushes the learning SW 16, the control section 15 directs the voice recognizing section 12 to convert the destination name input through the communication line 11 into voice data in the recognizable format. On the other hand, when a user pushes the start SW 17, the control section 15 directs the voice recognizing section 12 to voice-recognize the telephone number input through the communication line 11.

In the following, an explanation is given of operation for recording a telephone number by the communication terminal 10 in reference to FIG. 1.

In this embodiment, it is assumed that a telephone number is input by using the directory service. First, a user pushes numeric keys (not shown) to input a telephone number (for example, "104") into the telephone number calling section 20 for call out. After the call out, when the user gets through to the directory service, an operator of the directory service asks the user a destination name, etc. which the user wants to know. When the user answers the question, the required telephone number is provided to the user over the phone by synthetic voice.

When receiving the telephone number from the directory service, the user pushes the start SW 17. Having sensed the push of the SW 17, the control section 15 receives the telephone number of the destination party, which is provided by the synthetic voice. In addition, having sensed the push of the SW 17, the control section 15 outputs a predetermined control signal and the received telephone number to the voice recognizing section 12. Having received the control signal from the control section 15, the voice recognizing section 12 starts to recognize the telephone number provided by the synthetic voice triggered by the receipt of the control signal.

After finishing the voice recognition of the telephone number, the voice recognizing section 12 outputs the recognized telephone number to the control section 15. Having received the recognized telephone number from the section 12, the control section 15 sends it to the telephone number recording section 14 to record it.

The telephone number recognized by the voice recognizing section 12 is voice-synthesized in the voice synthesizing section 21 and outputted from the speaker 19. Thereby, it becomes possible to inform the user of the recognized telephone number. In addition, it is also possible to display the recognized telephone number by characters, etc. on the display section 22. Incidentally, the way of informing the user of the recognition result is not limited to those set forth herein. Herewith, the recording operation of the telephone number in the communication terminal 10 is completed.

In the following, an explanation is given of operation for recording the destination name by the communication terminal 10 with reference to FIG. 1.

Having completed the recording operation of the telephone number obtained through the directory service, first, the user pushes the learning SW 16. Subsequently, when the user vocalizes the destination name, which is to be associated with the recorded telephone number, and inputs it into the microphone 18, the control section 15 senses the push of the learning SW 16 and receives the destination name input through the microphone 18. In addition, having sensed the push of the SW 16, the control means 15 outputs a predetermined control signal and the destination name to the voice recognizing section 12. Having received the control signal from the control section 15, the voice recognizing section 12 converts the input destination name into information recognizable by the section 12. Incidentally, when receiving the control signal output in response to the push of the learning SW 16, the voice recognizing section 12 does not execute voice recognition to the input destination name. The converted destination name is recorded in the destination name recording section 13.

Subsequently, the control section 15 associates the destination name input from the microphone 18 with the telephone number recorded in the telephone number recording section 14. The control means 15 writes the destination name associated with the telephone number in the telephone number recording section 14. Herewith, the recording operation of the destination name is completed.

In the following, an explanation is given of operation for making a call by the communication terminal 10.

When the user pushes the start SW 17, the control section 15 detects the push and outputs a control signal in response to the push of the SW 17 to the voice recognizing section 12. Having received the control signal, the voice recognizing section 12 starts voice recognizing operation.

When a destination name is input through the microphone 18 and when the input destination name has been recorded in the destination name recording section 13, the voice recognizing section 12 identifies the input destination name as the one recorded in the section 13. On the other hand, when a destination name is input through the microphone 18 after a telephone number is input (recorded) by using the directory service or the like, the voice recognizing section 12 identifies the input destination name as the one to be associated with the input telephone number.

Having finished recognizing the destination name, the voice recognizing ection 12 informs the control section 15 of the recognition, result. The control section 15 searches the telephone number recording section 14 based on the recognition result received from the voice recognizing section 12 to determine whether or not the telephone number associated with the input destination name has been recorded in the recording section 14.

When it is determined that the associated telephone number has not been recorded in the recording section 14, the calling operation is not executed.

On the other hand, when it is determined that the associated telephone number has been recorded in the recording section 14, the control section 15 reads the telephone number therefrom. The control section 15 informs the telephone number calling section 20 of the read telephone number to have the section 20 execute the calling operation.

Incidentally, when executing the calling operation, the recognition result of the destination name can be announced to a user by outputting the, result with synthetic voice generated in the voice synthesizing section 21 through the speaker 19 in the same manner as in the case of notifying a user of a recognized telephone number obtained through the directory service, or the like. At this point, it is also possible to display the destination name on the display section 22 by characters, etc. Incidentally, the way to inform the user of the recognition result is not limited to those set forth herein. Herewith, the communication terminal terminates the calling operation.

In the following, an explanation is given of operation to inform a user whether or not a telephone number and the corresponding destination name have been recorded in the communication terminal 10.

First, a user utters a destination name at the microphone 18 to vocally input the name. The voice recognizing section 12 recognizes the voice (the destination name) input through the microphone 18. Subsequently, the control section 15 refers to the telephone number recording section 14 to determine whether or not the recognized destination name and the corresponding telephone number have been recorded therein.

Thereafter, the control section 15 directs the voice synthesizing section 21 to voice-synthesize the reference result obtained through the telephone number recording section 14 (either the destination name or the telephone number has been recorded; both of them have been recorded; or neither of them have been recorded, etc.) and to output the voice-synthesized result from the speaker 19. Thereby, the user is informed of the reference result. At this point, the control section 15 may display the reference result on the display section 22. Incidentally, the way to inform the user of the reference result is not limited to those set forth herein. Herewith, the communication terminal 10 terminates the informing operation of the reference result.

Incidentally, while the reference operation through the telephone number recording section 14 is triggered by the input of the vocalized destination name according to this embodiment, it is also possible to arbitrary set the trigger of the reference operation. For example, the reference operation may be executed in response to an input of the other information, for example, a telephone number, ID number or the like.

FIG. 2 is a diagram showing a configuration of the voice recognizing section 12 used in the first embodiment of the present invention. In the following, an explanation is given of the configuration and operation of the voice recognizing section 12 in this embodiment.

The voice recognizing section 12 comprises a SW 31, a telephone number recognizing section 32 and a destination name recognizing section 33. The SW 31 switches operation between the telephone number recognizing section 32 and the destination name recognizing section 33 based on a control signal from the control section 15. When the telephone number recognizing section 32 is selected by the SW 31, the section 32 identifies a voice (synthetic voice) as a telephone number obtained through the directory service or the like, and executes voice recognition. On the other hand, when the destination name recognizing section 33 is selected by the SW 31, the section 31 determines an input voice as a destination name that would be input at the time of calling, and executes voice recognition.

The control section 15 determines whether or not the communication terminal 10 is connected to, for example, the directory service, and outputs a control signal to the switch 31 according to the determination. When it is determined that the terminal 10 is connected to the directory service, the control section 15 outputs a control signal for switching to the telephone number recognizing section 32 to the SW 31. Otherwise, the control section 15 controls the SW 31 so as to switch to the destination name recognizing section 33. Incidentally, the control section 15 may control the SW 31 based on the other conditions.

By the above-described switching operation, it becomes possible to reduce wrong recognition that occurs when determining whether the input voice is the telephone number or the destination name. Namely, occurrence of such mistake as recognizing an input telephone number as a destination name, and vice versa can be prevented. Incidentally, the way to prevent the occurrence of such recognition error in the voice recognizing section 12 is not limited to those set forth herein.

FIG. 3 is a management table recorded in the telephone number recording section 14 used in the first embodiment of the present invention. In the following, an explanation is given of management of information about telephone numbers and destination names in this embodiment.

As depicted in FIG. 3, the management table includes information about ID numbers, telephone numbers and destination names, which are associated with each other, respectively.

When a telephone number is input through the directory service or the like, the telephone number is stored in the column of the telephone number in a blank record in the managing table. At this point, since the corresponding destination name has not been input, the column of the destination name in the record in which the telephone number has been recorded is blank or in a state of "not associated" as shown in the record of the ID number "2" in FIG. 3. Subsequently, when the corresponding destination name is input, the input destination name is recorded in the column of the destination name in the same record in which the telephone number has been recorded.

In the case where executing voice dialing (initiated by user's voice), when a destination name is input by voice, the voice recognizing section 12 recognizes the input voice and informs the control section 15 of the recognition result. The control section 15 searches the telephone number recording section 14 for the destination name indicated by the input voice based on the received recognition result. As a result of the search, when it is determined that the destination name identical to the input one has been recorded in the recording section 14, the control section 15 reads the telephone number associated with the destination name in the same record into the telephone number calling section 20 to make a call.

Figure 5:
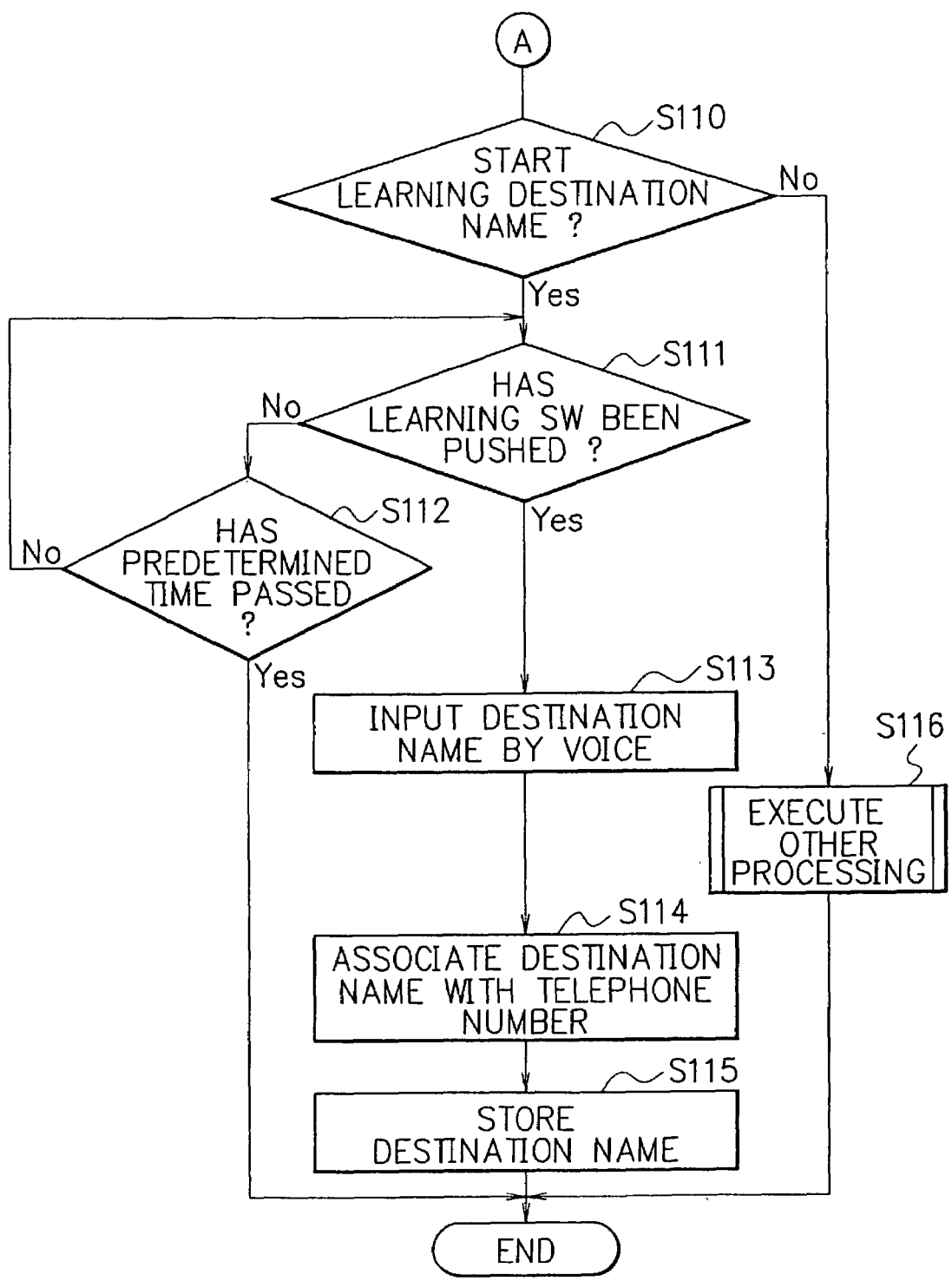
FIG. 5 is a flowchart showing a flow of operation to record a destination name by the communication terminal according to the first embodiment.

FIG. 4 is a flowchart showing a flow of operation for recording a telephone number executed by the communication terminal 10 according to the first embodiment of the present invention. FIG. 5 is a flowchart showing a flow of operation for recording a destination name executed by the communication terminal 10 according to the first embodiment. In the following, based on FIG. 1, an explanation is given of recording operation for the telephone number and the destination name by the communication terminal 10 along the flowcharts of FIGS. 4 and 5.

First, the control section 15 determines whether or not there is a request for starting the operation of recording a telephone number (telephone number filing operation) through the directory service or the like (Step S101). When it is determined that there is not such a request (Step S101/No), the process in Step S101 is repeated.

On the other hand, when it is determined that the request has been made (Step S101/Yes), the control section 15 determines whether or not the communication line 11 is connected to another communication terminal to find out the state of the line 11 (Step S102). When it is determined that the line 11 is not busy (Step S102/No), the communication terminal 10 executes predetermined processing other than the telephone number filing (Step S103).

On the other hand, when it is determined that the line 11 is busy (Step S102/Yes), the control section 15 determines whether or not the start SW 17 has been pushed (Step S104). When it is determined that the start SW 17 has not been pushed (Step S104/No), the operation goes back to Step S102 to monitor the connection state of the communication line 11.

On the other hand, when it is determined that the start SW 17 has been pushed (Step S104/Yes), the voice recognizing section 12 starts voice recognizing operation (Step S105).

Subsequently, the voice recognizing section 12 recognizes a telephone number based on voice data input through the communication line 11 (Step S106).

When the voice recognizing section 12 completes the telephone-number recognition, the control section 15 writs the telephone number recognized by the section 12 in the telephone number recording section 14 (Step S107).

When the telephone number is recorded in the section 14, the communication terminal 10 finishes the voice recognizing operation (Step S108).

Thereafter, the control section 15 controls each section to inform a user of the telephone number recognized by the voice recognizing section 12, that is, the telephone number recorded in the telephone number recording section 14 (Step S109). For example, the recorded telephone number may be output from the speaker 19 in the form of synthesized voice generated by the voice synthesizing section 21, or displayed on the display section 22 by characters or the like.

Subsequently, the communication terminal 10 learns a voice recognition pattern of a destination name to be associated with the telephone number recorded in the telephone number recording section 14. After the user is informed of the telephone number, proceeding to the flowchart in FIG. 5, the control section 15 determines whether or not there is a request for starting the learning of voice recognition pattern of a destination name (a request for recording a destination name) (Step S110).

When it is determined that there is not a request for the pattern learning (Step S110/No), the other operation is executed (Step S116). For example, a destination name may be input into the communication terminal 10 through buttons (not shown), or there may be executed a calling operation by inputting a user's voice of another destination name that has been recorded in the communication terminal 10. Alternatively, a calling operation without inputting the user's voice may be executed, namely, as common dialing operation, the user makes a call by directly inputting a telephone number with numeric keys, etc. or by selecting a telephone number of another party from the telephone numbers recorded in the telephone number recording section 14.

On the other hand, when it is determined that the request has been made (Step S110/Yes), the control section 15 determines whether or not the learning SW 16 has been pushed (Step S111).

When it is determined that the learning SW 16 has not been pushed (Step S111/No), the control section 15 determines whether or not predetermined time has passed with the learning SW 16 being unpushed (Step S112). When it is determined that the predetermined time has passed in this state (Step S112/Yes), the communication terminal 10 finishes the operation for learning the destination name. If it is determined that the predetermined time has not passed (Step S112/No), the processing in Step S111 is repeated.

On the other hand, when it is determined that the learning SW 16 has been pushed (Step S111/Yes), the destination name is input (Step S113), and the control section 15 associates the input voice (destination name) with the telephone number recorded in the telephone number recording section 14 (Step S114).

Subsequently, the voice recognizing section 12 converts the input voice (destination name) into a data format recognizable by the section 12 to record the data format in the destination name recording section 13 (and the telephone number recording section 14) (Step S115). The data format is not limited but it may be determined arbitrarily unless the input voice is recognizable. For example, the data format may be determined based on required accuracy for recognizing a voice pattern, a degree of data capacity, or the like. Herewith, the communication terminal 10 finishes the operation for recording the telephone number and the destination name.

Figure 6:
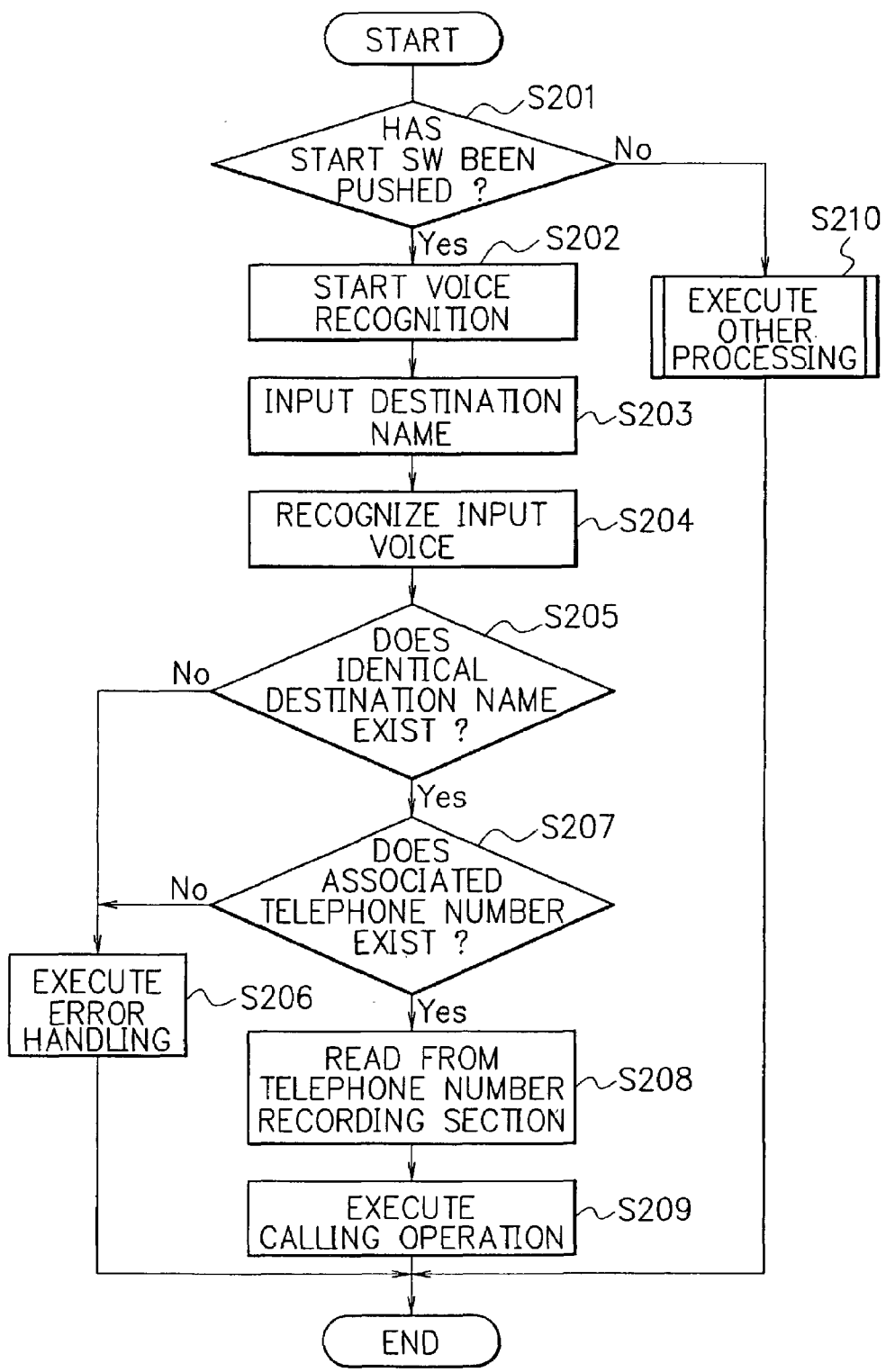
FIG. 6 is a flowchart showing a flow of operation to make a call by the communication terminal according to the first embodiment.

FIG. 6 is a flowchart showing a flow of calling operation by the communication terminal 10 according to the first embodiment of the present invention. In the following, in reference to FIG. 1, an explanation is given of the dialing operation by the communication terminal 10 in line with the flowchart of FIG. 6.

First, the control section 15 determines whether or not there is a request to start the voice calling operation. Namely, the control section 15 determines whether or not the start SW 17 has been pushed (Step S201).

When it is determined that there is not such a request (Step S201/No), a user execute calling operation without uttering a destination name (Step S210). That is, as a common dialing operation, the user directly operates numeric keys, etc. or selects a telephone number of another party from the telephone numbers recorded in the telephone number recording section 14.

On the other hand, when it is determined that the request has been made, that is, the start SW 17 has been pushed (Step S201/Yes), the voice recognizing section 12 starts to execute voice recognition (Step S202).

Subsequently, the control section 15 monitors the microphone 18 to detect a vocal input of a destination name. When the destination name is input from the microphone 18 (Step S203), the voice recognizing section 12 recognizes, or executes pattern matching to, the input voice (input destination name) (Step S204).

Thereafter, the control section 15 determines whether or not the voice recognizing section 12 has succeeded in recognizing the input voice, that is, whether or not the input destination name has been recorded in the destination name recording section 13 (Step S205).

When it is determined that the voice recognizing section 12 has succeeded in recognizing the input voice, that is, there is a record found matching the input destination name (Step S205/Yes), the control section 15 determines whether or not the telephone number associated with the recognized destination name has been recorded in the telephone number recording section 14 (Step S207).

When it is determined that the associated telephone number has been recorded in the recording section 14 (Step S207/Yes), the control section 15 reads the telephone number out of the recording section 14 (Step S208). Subsequently, the telephone number calling section 20 calls the read telephone number (Step S209).

When it is determined that the voice recognizing section 12 has failed in recognizing the input destination name, that is, there is no record matching the input destination name (Step S205/No) or the telephone number associated with the recognized destination name has not been recorded (Step S207/No), the communication terminal 10 executes error handling (Step S206).

The error handling in Step S206 includes the following operation. For example, when the voice recognizing section 12 fails in voice recognition although a destination name has been vocally input for call out, the communication terminal 10 outputs synthesized voice generated by the voice synthesizing section 21 from the speaker 19 to inform the user of the fail in the voice recognition. At this point, the communication terminal 10 may display the effect on a display or the like in the display section 22 by characters, etc. Nevertheless, when executing calling, a telephone number is directly input through numeric keys, etc. or a telephone number is selected from one or more telephone numbers recorded in the telephone number recording section 14. In the alternative, the communication terminal 10 may request the user to vocally input the destination name to try again the voice calling based on the voice recognition. Besides, when the control section 15 determines that a telephone number (or a destination name) has not been recorded in the telephone number recording section 14, it is possible to automatically call the directory service so as to newly obtain and record the telephone number.

Figure 7:
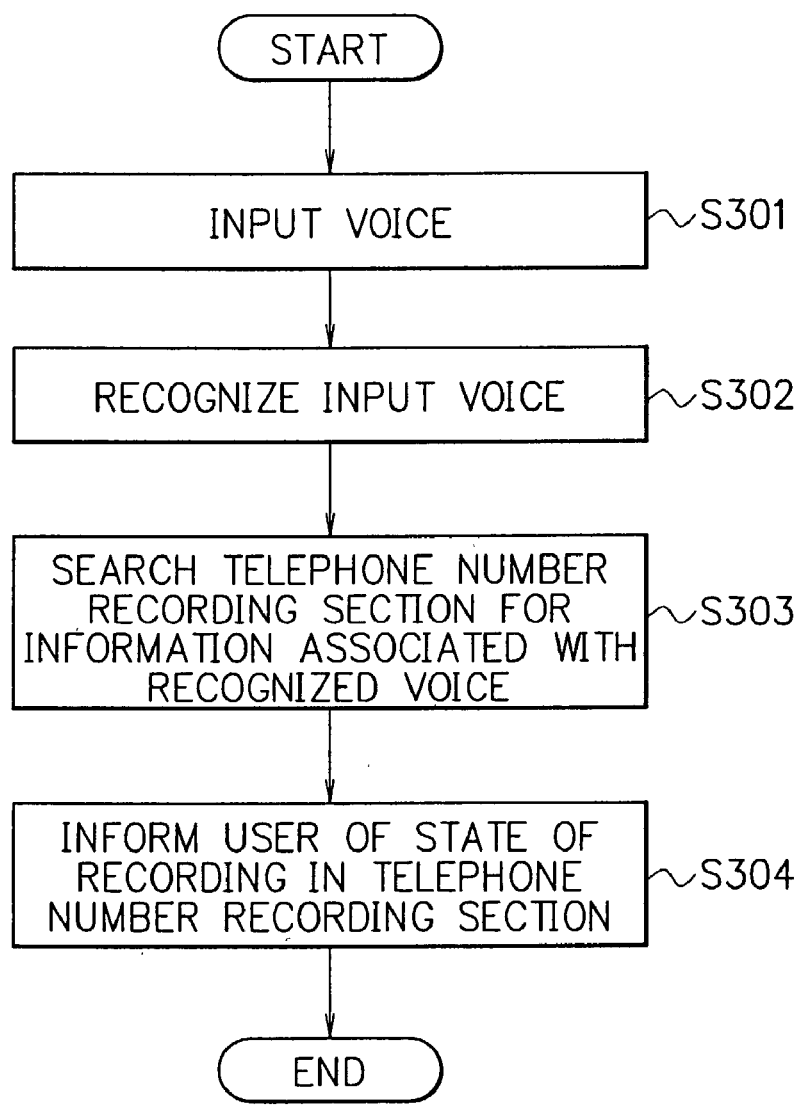
FIG. 7 is a flowchart showing a flow of operation to inform a state of recording of a telephone number and the destination name by the communication terminal according to the first embodiment.

FIG. 7 is a flowchart showing a flow of operation for informing a state of recording in connection with telephone numbers and destination names by the communication terminal 10 according to the first embodiment of the present invention. In the following, in conjunction with FIG. 1, an explanation is given of the informing operation by the communication terminal 10 in keeping with the flowchart of FIG. 7.

First, when determining that a user has pushed a predetermine key (not shown) to input voice (a telephone number or a destination name) from the microphone 18 (Step S301), the control section 15 outputs a predetermined control signal to the voice recognizing section 12 to have the section 12 start voice recognition (Step S302).

The control section 15 refers to the telephone number recording section 14 to detect whether or not the recognized destination name and the corresponding telephone number have been recorded therein (Step S303).

After the reference, the control section 15 has the voice synthesizing section 21 generate synthetic voice indicating the reference result obtained through the recording section 14 and output the synthetic voice form the speaker 19. Thereby, the user is informed of the reference result (Step S304). The control section 15 may display the reference result on a display in the display section 22 to inform the user. Incidentally, the way to inform the user of the reference result is not limited to those set forth herein. Herewith, the communication terminal 10 completes the operation for informing the reference result.

As described hereinbefore, according to the first embodiment, the telephone number vocally input through the communication line 11 is recognized in the voice recognizing section 12 and the recognized telephone number is recorded in the telephone number recording section 14. After the recording, the destination name is recorded in the destination name recording section 13 in the form of voice data. In addition, the destination name is associated with the telephone number recorded in the telephone number recording section 14, and recorded in the recording section 14. When the user utters the destination name at the microphone 18, calling operation is executed to call the destination party. Therefore, according to this embodiment, when using the directory service, there is no need to transcribe an announced telephone number on paper or the like, and only by vocalizing the name of the other party, the user can easily call the telephone number announced through the directory service.

Moreover, according to this embodiment, when the voice recognizing section 12 failed in recognizing the destination name recorded in the destination name recording section 13, the communication terminal 10 automatically calls the directory service. Therefore, it becomes possible to easily record a telephone number and learn a destination name.

Furthermore, according to this embodiment, when a user utters a destination name or a telephone number, the state of recording in the telephone number recording section 14 is inquired. The search result (reference result) is output from the speaker 19 and/or on the display section 22. Therefore, a user can be easily informed of whether or not the destination name and the telephone number have been recorded in the telephone number recording section 14.

[Second Embodiment]

A communication terminal 10 according to the second embodiment of the present invention has the same configuration and executes the same operation as in the first embodiment unless special mention is made.

Figure 8:
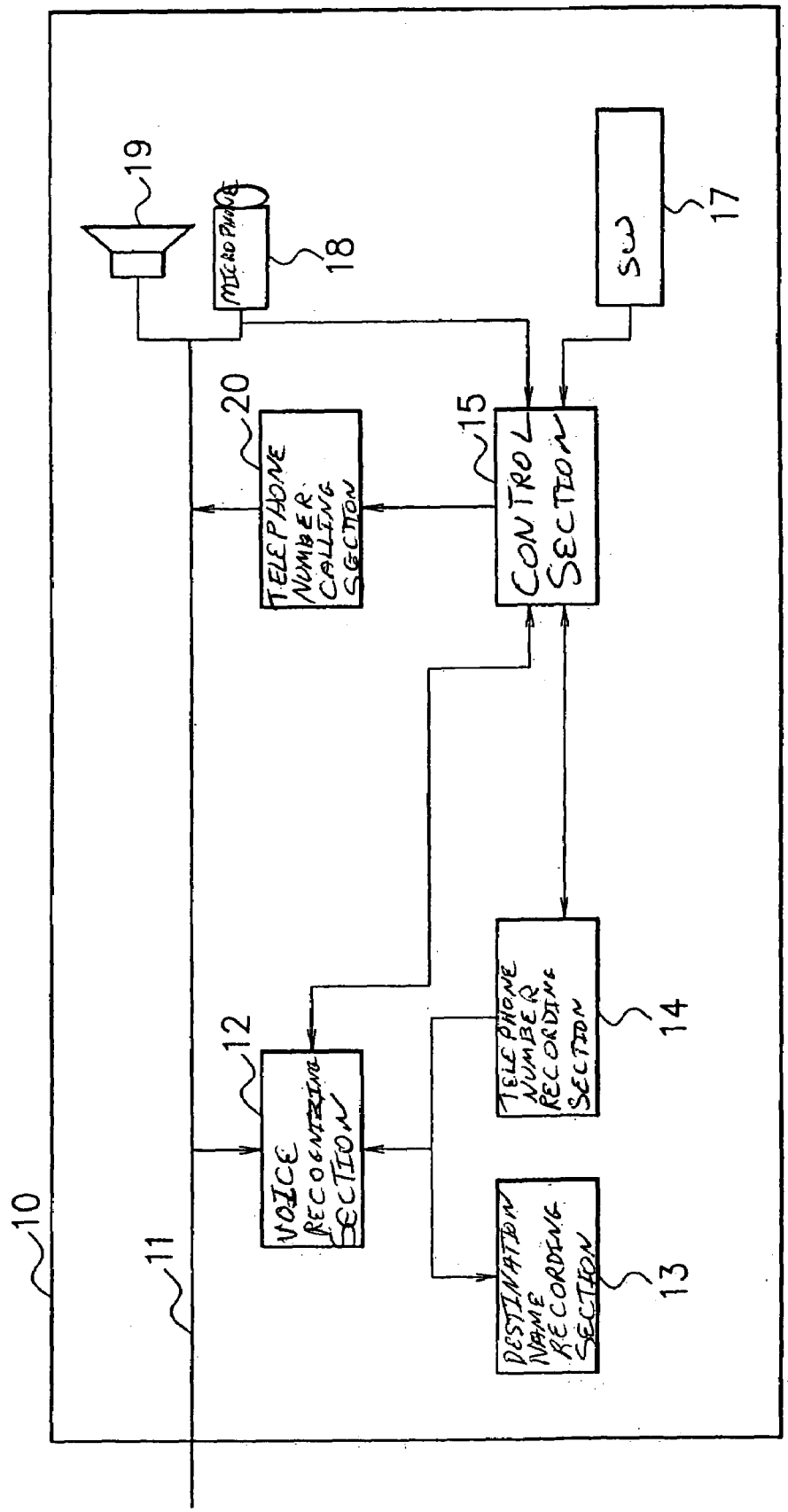
FIG. 8 is a block diagram showing a configuration of a communication terminal according to a second embodiment of the present invention.

FIG. 8 is a diagram showing a configuration of a communication terminal 10 according to the second embodiment of the present invention. In the following, an explanation is given of a configuration and operation of the communication terminal 10 according to the second embodiment.

The communication terminal 10 in this embodiment comprises a communication line 11, a voice recognizing section 12, a destination name recording section 13, a telephone number recording section 14, a control section 15, a start SW 17, a microphone 18, a speaker 19 and a telephone number calling section 20. The control section 15 is directly coupled with the microphone 18 and monitors inputs therefrom differently from the first embodiment.

In this embodiment, the processes from recognizing a telephone number obtained through the directory service to recording it in the telephone number recording section 14 are executed in the same manner as in the first embodiment. Subsequently, in the first embodiment, the destination name recording operation (learning operation) is executed when the control section 15 senses the push of the learning SW 16. However in the second embodiment, the subsequent learning operation is executed triggered by the detection of a voice input from the microphone 18 by the control section 15. When the directory service finishes and a telephone number is recorded in the telephone number recording section 14, the control section 15 monitors a voice input from the microphone 18. When detecting the voice input from the microphone 18, the control section 15 sends a control signal to the voice recognizing section 12. The following operation for recording the destination name is executed in the same manner as in the first embodiment.

As explained hereinbefore, according to the second embodiment, the control section 15 monitors the destination name vocally input from the microphone 18 after the recording of the telephone number, and the recording operation for the destination name is initiated by the detection of the voice input. Thereby, a user can easily start the operation for recording the destination name by voice without pushing a predetermined key.

The communication terminal 10 executes the following processes of: inputting voice around the terminal 10; recognizing a telephone number input by voice; recording the recognized telephone number; recording a destination name input by voice in the form of voice data; recording the destination name by associating it with the recorded telephone number; determining whether or not a telephone number has been recorded; rejecting, when it is determined that a recognized telephone number has been recorded, newly recording the telephone number, and informing a user that the telephone number is not to be recorded; recognizing input voice to determine whether or not the recognized voice indicates any one of recorded destination names; reading and calling, when it is determined that the destination name indicated by the input voice is identical to one of the recorded destination names, the telephone number associated with the destination name; calling, when it is determined that the destination name indicated by the input voice is not identical to the any of the recorded destination names, the directory service to establish a connection through a communication line; monitoring a voice input, and when detecting the voice input, converting the input voice into voice data to record it as a destination name; determining whether or not an input voice is a voice input through the communication line or a voice obtained through the above-described voice inputting process (a voice from around the terminal 10); controlling voice recognition based on the determination result; identifying the input voice as the one indicating a telephone number when it is determined that the input voice is input through the communication line, identifying the input voice as the one, indicating a destination name when it is determined that the input voice is from around the terminal 10, and controlling voice recognition based on the determination (identification); and informing a user of the recognition result obtained based on the input voice or that the input voice has not been recognized. The above-described processes are executed by a program included in the communication terminal 10. The program may be recorded in and loaded from a recording medium such as an optical disk or magnetic disk, or may be loaded from external apparatus connected to the communication terminal 10 via a predetermined network.

As set forth hereinbefore, according to the present invention, a telephone number vocally input through a communication line is recognized and recorded. After the recording, a destination name is recorded in the form of voice data. The recorded destination name is associated with the recorded telephone number to be recorded. When the destination name is input by voice, the telephone number associated with the destination name is called. Therefore, according to the present invention, when using the directory service or the like, a user needs not transcribe an announced telephone number on paper, etc. Moreover, it becomes possible for a user to easily call the telephone number obtained through the directory service by uttering the destination name.

Moreover, according to the present invention, when failing in recognizing a destination name, the directory service is called automatically. Therefore, the recording of a telephone number and the learning (learning of a voice recognition pattern) of a destination name can be easily executed.

Besides, according to the present invention, when vocalizing a destination name or a telephone number, a state of recording of the destination name and the telephone number is inquired. The inquiry result is output by characters, images, voice messages and the like. Therefore, it becomes possible to easily inform a user whether or not the destination name and the telephone number have been recorded.

Furthermore, according to the present invention, by monitoring a voice (a destination name) input after the recording of a telephone number, it becomes possible to easily initiate the operation for recording the destination name by voice without pushing a predetermined key.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A communication terminal connected to another communication terminal via a communication line for inputting voice via the communication line, comprising:
   a voice inputting means for inputting voice around the communication terminal;
   a telephone number voice recognizing means for recognizing a telephone number input by voice;
   a telephone number recording means for recording the telephone number recognized by the telephone number voice recognizing means;
   a destination name recording means for recording a destination name input by voice in the form of voice data;
   an association recording means for recording the destination name recorded by the destination name recording means in association with the recorded telephone number;
   a telephone number record determining means for determining whether or not the telephone number recognized by the telephone number voice recognizing means has been recorded by the telephone number recording means;
   a telephone number record rejecting means for rejecting the recording of the recognized telephone number when the telephone number record determining means determines that the recognized telephone number has been recorded, and informing a user that the telephone number is not to be newly recorded;
   a destination name voice recognizing means for recognizing an input voice to determine whether or not the recognized voice is identical with one of the destination names recorded by the destination name recording means;
   a calling means for reading, when the destination name voice recognizing means determines that the input voice is identical with the recorded destination name, the telephone number associated with the destination name to call the telephone number;
   an input voice determining means for determining whether the input voice is input via the communication line or input through the voice inputting means;
   a voice recognition control means for controlling the voice recognition based on a result of the determination by the input voice determining means; and
   an informing means for informing a user of a recognition result obtained in connection with the input voice or that the input voice has not been recognized.

2. The communication terminal as claimed in claim 1, wherein the destination name recording means monitors an input voice, converts the input voice into the voice data when detecting the input voice, and records the voice data as the destination name.

3. The communication terminal as claimed in claim 1, including a directory service calling means for calling, when the destination name voice recognizing means determines that the input voice is not identical with any of the recorded destination names, a directory service to establish connection thereto via the communication line.

4. The communication terminal as claimed in claim 1, wherein the voice recognition control means controls the voice recognition on the basis of the determination that:
   when the input voice determining means determines that the input voice is input via the communication line, the input voice indicates the telephone number; or
   when the input voice determining means determines that the input voice is input through the voice inputting means, the input voice indicates the destination name.

5. A communication method using a communication terminal connected to another communication terminal via a communication line for inputting voice via the communication line, comprising:
   a voice inputting step for inputting voice around the communication terminal;
   a telephone number voice recognizing step for recognizing a telephone number input by voice;
   a telephone number recording step for recording the telephone number recognized at the telephone number voice recognizing step;
   a destination name recording step for recording a destination name input by voice in the form of voice data;
   an association recording step for recording the destination name recorded at the destination name recording step in association with the recorded telephone number;
   a telephone number record determining step for determining whether or not the telephone number recognized at the telephone number voice recognizing step has been recorded at the telephone number recording step;
   a telephone number record rejecting step for rejecting the recording of the recognized telephone number when it is determined that the recognized telephone number has been recorded at the telephone number record determining step, and informing a user that the telephone number is not to be newly recorded;

a destination name voice recognizing step for recognizing an input voice to determine whether or not the recognized voice is identical with one of the destination names recorded at the destination name recording step;

a calling step for reading, when it is determined that the input voice is identical with the recorded destination name at the destination name voice recognizing step, the telephone number associated with the destination name to call the telephone number;

an input voice determining step for determining whether the input voice is input via the communication line or input through the voice inputting step;

a voice recognition control step for controlling the voice recognition based on a result of the determination at the input voice determining step; and an informing step for informing a user of a recognition result obtained in connection with the input voice or that the input voice has not been recognized.

6. The communication method as claimed in claim 5, wherein an input voice is monitored and converted into the voice data when detected to record the voice data as the destination name at the destination name recording step.

7. The communication method as claimed in claim 5, including a directory service calling step for calling, when it is determined that the input voice is not identical with any of the recorded destination names at the destination name voice recognizing step, a directory service to establish connection thereto via the communication line.

8. The communication method as claimed in claim 5, wherein, at the voice recognition control step, the voice recognition is controlled on the basis of the determination that:

when it is determined that the input voice is input via the communication line at the input voice determining step, the input voice indicates the telephone number; or when it is determined that the input voice is input through the voice inputting step at the input voice determining step, the input voice indicates the destination name.

9. A computer readable program, to control a communication terminal which is connected to another communication terminal via a communication line and into which voice is input via the communication line, for having a computer execute:

a voice inputting process for inputting voice around the communication terminal;

a telephone number voice recognizing process for recognizing a telephone number input by voice;

a telephone number recording process for recording the telephone number recognized in the telephone number voice recognizing process;

a destination name recording process for recording a destination name input by voice in the form of voice data;

an association recording process for recording the destination name recorded in the destination name recording process in association with the recorded telephone number;

a telephone number record determining process for determining whether or not the telephone number recognized in the telephone number voice recognizing process has been recorded in the telephone number recording process;

a telephone number record rejecting process for rejecting the recording of the recognized telephone number when it is determined that the recognized telephone number has been recorded in the telephone number record determining process, and informing a user that the telephone number is not to be newly recorded;

a destination name voice recognizing process for recognizing an input voice to determine whether or not the recognized voice is identical with one of the destination names recorded in the destination name recording process;

a calling process for reading, when it is determined that the input voice is identical with the recorded destination name in the destination name voice recognizing process, the telephone number associated with the destination name to call the telephone number;

an input voice determining process for determining whether the input voice is input via the communication line or input through the voice inputting process;

a voice recognition control process for controlling the voice recognition based on a result of the determination in the input voice determining process; and an informing process for informing a user of a recognition result obtained in connection with the input voice or that the input voice has not been recognized.

10. The program as claimed in claim 9, wherein, in the destination name recording process, an input voice is monitored and converted into the voice data when detected to record the voice data as the destination name.

11. The program as claimed in claim 9, for having the computer execute a directory service calling process for calling, when it is determined that the input voice is not identical with any of the recorded destination names in the destination name voice recognizing process, a directory service to establish connection thereto via the communication line.

12. The program as claimed in claim 9, wherein, in the voice recognition control process, the voice recognition is controlled on the basis of the determination that:

when it is determined that the input voice is input via the communication line in the input voice determining process, the input voice indicates the telephone number; or when it is determined that the input voice is input through the voice inputting process in the input voice determining process, the input voice indicates the destination name.

* * * * *